United States Patent
Sadler

[11] 3,922,858
[45] Dec. 2, 1975

[54] TANDEM MASTER CYLINDERS FOR HYDRAULIC BRAKING SYSTEMS

[75] Inventor: Francis Antony Dawson Sadler, Bromsgrove, England

[73] Assignee: Girling Limited, Birmingham, England

[22] Filed: Feb. 12, 1974

[21] Appl. No.: 441,873

[30] Foreign Application Priority Data
Feb. 20, 1973  United Kingdom............... 8179/73

[52] U.S. Cl. ................. 60/562; 60/581; 188/345
[51] Int. Cl.² ...................................... F15B 7/08
[58] Field of Search ............ 60/562, 581; 188/345

[56] References Cited
UNITED STATES PATENTS
3,488,959   1/1970   Tenniswood.......................... 60/562

FOREIGN PATENTS OR APPLICATIONS
902,391   8/1962   United Kingdom................. 60/581

Primary Examiner—Martin P. Schwadron
Assistant Examiner—H. Burks, Sr.
Attorney, Agent, or Firm—Scrivener Parker Scrivener and Clarke

[57] ABSTRACT

In a tandem master cylinder for hydraulic braking systems a pedal-operated main piston is coupled to a secondary piston by a split collet embracing heads on aligned axial stems on the pistons, said heads being axially movable in a gap in the collet of which the axial length determines the maximum separation of the pistons.

3 Claims, 3 Drawing Figures

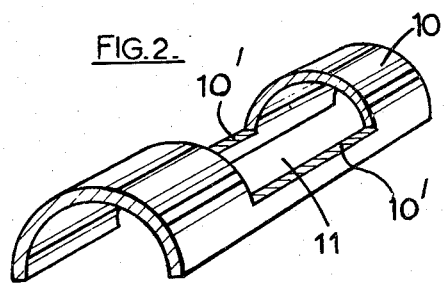
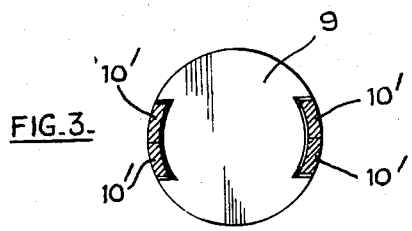

TANDEM MASTER CYLINDERS FOR HYDRAULIC BRAKING SYSTEMS

This invention relates to improvements in tandem master cylinders for hydraulic braking systems for vehicles, the master cylinders being of the kind in which a pedal-operated piston working in one part of the cylinder bore is coupled to a secondary piston working in another part of the bore by means limiting relative axial movement between the pistons in both directions and the pistons are urged apart by a spring.

One of the objects of the present invention is to provide simple, effective and economical means for interconnecting the pistons.

According to our present invention, in a tandem master cylinder of the kind set forth, the main and secondary pistons are interconnected by a split collet embracing heads on aligned axial stems or extensions on the pistons.

The collet is conveniently formed by two co-operating substantially semi-cylindrical parts having a gap in which the heads on the pistons are axially movable, the axial length of the gap being determined by the maximum separation of the pistons to be permitted.

One form of our invention is illustrated by way of example in the accompanying drawings in which:

FIG. 2 is a perspective view of one half of the collet for coupling the pistons together.

FIG. 3 is a fragmentary section on the line 3—3 of FIG. 1.

Figure 1:
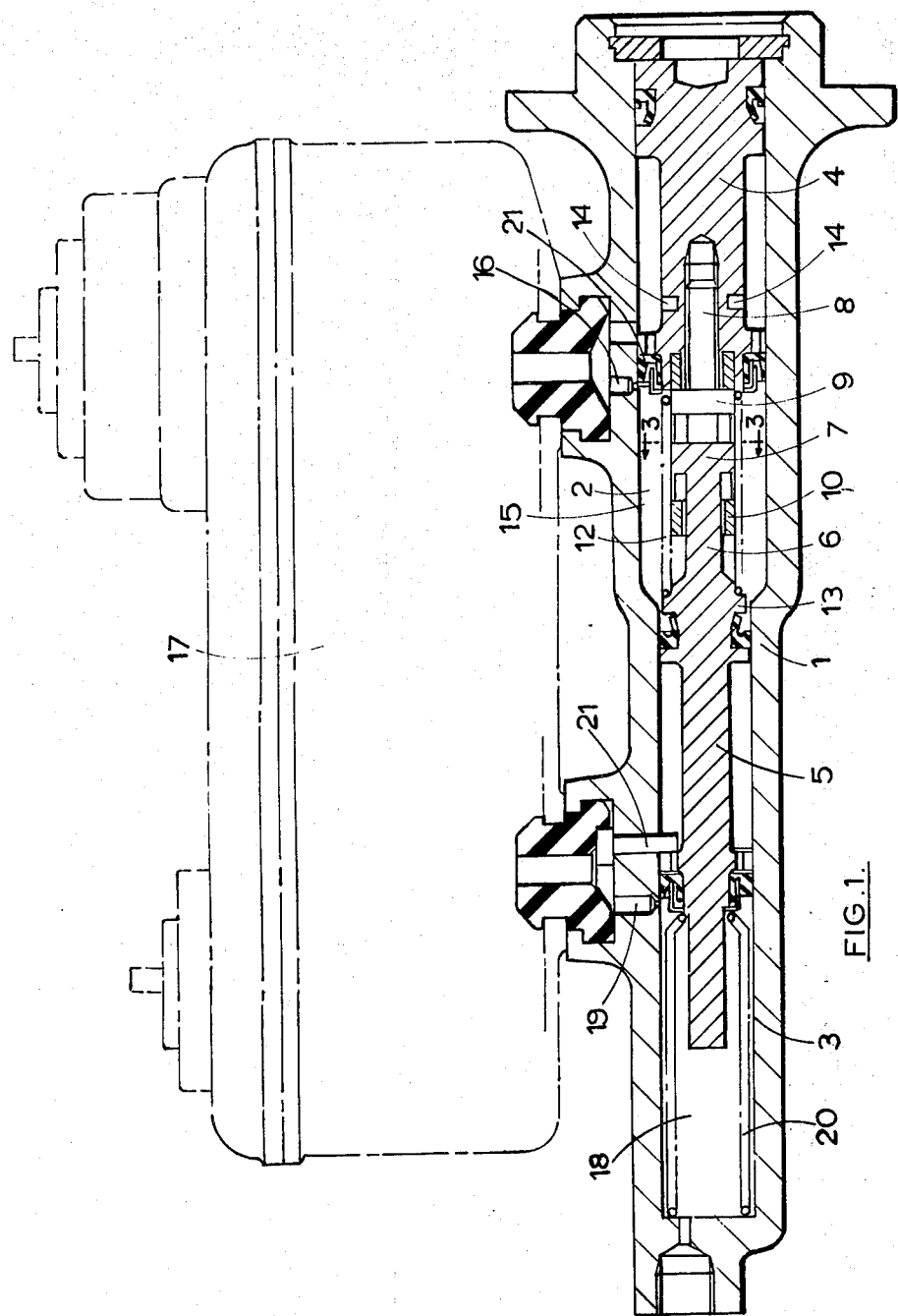
FIG. 1 is a longitudinal section of a tandem master cylinder.

As shown in FIG. 1, a tandem master cylinder 1 has a stepped bore 2, 3. A pedal-operated piston 4 works in the bore of greater diameter and a secondary piston 5 works in the bore of smaller diameter.

The rear end of the piston 5 has an axial extension 6 of reduced diameter terminating in a head 7. A bolt 8 terminating in a head 9 is screwed into the forward end of the piston 4. The heads are embraced by a split collet 10 formed in two co-operating halves of which one is shown in FIG. 2.

Each half of the collet is of part-cylindrical form and of a radius substantially equal or slightly greater than that of the heads 7 and 9. The central part is cut out to provide a gap 11 in which the heads 7 and 9 are axially movable.

Opposed longitudinal slots are formed in each of the heads 7 and 9 as shown in FIG. 3 to accommodate the narrow longitudinal bars 10' of the collet connecting the cylindrical parts at opposite ends of the gap 11.

The rear end of the collet is received in a counterbore in the forward end of the piston 4 by which it is located. The other end of the collet is freely movable over the extension of the piston 5.

The pistons are urged apart by a compression spring 12 which abuts between the rear end of the piston 4 and a shoulder 13 on the secondary piston 5.

To avoid any risk of the bolt 8 working loose in the piston 4 opposed radial holes 14 are drilled in the piston and after the bolt has been screwed in pins are driven into these holes to deform the screw-thread.

The minimum distance between the pistons is defined by the abutting of the heads 7 and 9, and the maximum separation of the pistons is defined by the engagement of the heads with abutments defined by the opposite ends of the gap 11 in the collet.

The pressure space 15 in the part 3 of the cylinder bore between the pistons is connected by a port 16 in the cylinder wall to a reservoir 17, and the pressure space 18 between the piston 5 and the closed end of the cylinder is connected by a similar port 19 to the same or a separate reservoir. Both ports are open when the pistons are in the fully retracted positions shown in FIG. 1. The piston 5 is urged into the retracted position by a return spring 20 which holds the piston against a stop 21.

When the main piston 4 is advanced by the brake pedal the port 16 is closed as the seal 21 on that piston passes over it and pressure is generated in the space 15. This pressure acting on the piston 5 urges that piston rearwardly to close the port 19 and generate pressure in the space 18.

If there should be a failure in the brake system supplied from the space 15 the main piston 4 will advance until the head 9 carried by that piston abuts the head 7 carried by the piston 5. The piston 5 is then advanced mechanically by the piston 4 to generate pressure in the space 18.

Similarly, if there is a failure in the system supplied from the pressure space 18 the piston 5 will move forwardly relative to the piston 4 to the extent allowed by the gap in the collet, and as there can then by no further separation of the pistons pressure will be generated in the space 15.

I claim:

1. A tandem master cylinder for hydraulic braking systems for vehicles in which a pedal-operated main piston working in a part of the cylinder bore is coupled to a secondary piston working in another part of the bore by means limiting relative axial movement between the pistons in both directions and the pistons are urged apart by a spring, wherein the main and secondary pistons are interconnected by a split collet embracing heads on aligned axial stems on the pistons, said collet including axially spaced abutment means engageable by said heads; and serving to limit axial separation of the pistons.

2. A tandem master cylinder as in claim 1 wherein said collet comprises co-operating semi-cylindrical parts having a central gap in which said heads are axially movable and at the ends of which are located said abutment means.

3. A tandem master cylinder as in claim 1 wherein one of said heads is formed on an axial extension of the rear end of the secondary piston and the other head is formed on an axial stem secured into the main piston within a counterbore in the forward end of said piston which receives the rear end of said collet.

* * * * *